US010003918B1

(12) United States Patent
Tudor et al.

(10) Patent No.: US 10,003,918 B1
(45) Date of Patent: Jun. 19, 2018

(54) LOCATION BASED LOCAL EMERGENCY CONTACT

(71) Applicants: Charles R. Tudor, Virginia Beach, VA (US); Dani R. Sleiman, Virginia Beach, VA (US)

(72) Inventors: Charles R. Tudor, Virginia Beach, VA (US); Dani R. Sleiman, Virginia Beach, VA (US)

(73) Assignee: Worldwide Live Holding, LLC, Chesapeake, VA (US)

( * ) Notice: Subject to any disclaimer, the term of this patent is extended or adjusted under 35 U.S.C. 154(b) by 0 days. days.

(21) Appl. No.: 15/478,296

(22) Filed: Apr. 4, 2017

Related U.S. Application Data

(60) Provisional application No. 62/319,044, filed on Apr. 6, 2016, provisional application No. 62/403,629, filed on Oct. 3, 2016.

(51) Int. Cl.
*H04M 11/04* (2006.01)
*H04W 4/02* (2018.01)
*H04W 4/22* (2009.01)
*G06F 17/30* (2006.01)

(52) U.S. Cl.
CPC .......... *H04W 4/02* (2013.01); *G06F 17/3087* (2013.01); *H04W 4/22* (2013.01); *H04W 4/90* (2018.02)

(58) Field of Classification Search
CPC ..... H04W 4/22; H04W 76/007; H04W 64/00; H04W 76/02; H04W 84/04; H04W 36/14; H04W 4/028; H04W 4/025; H04W 64/003; H04M 2242/04; H04M 11/04; H04M 2242/30; H04M 3/436; H04M 3/5116; H04M 1/2535

USPC ........... 455/404.2, 404.1, 456.1, 414.1, 415, 455/422.1, 445, 456.3, 457, 521
See application file for complete search history.

(56) References Cited

U.S. PATENT DOCUMENTS

| | | | |
|---|---|---|---|
| 5,914,941 | A | 6/1999 | Janky |
| 6,711,622 | B1 | 3/2004 | Fuller et al. |
| 6,970,915 | B1 | 11/2005 | Partovi et al. |
| 7,738,417 | B2 | 6/2010 | Li |
| 7,936,790 | B2 | 5/2011 | Schmidt et al. |
| 8,244,068 | B2 | 8/2012 | Thorn |
| 8,483,654 | B2 | 7/2013 | Levinson et al. |

(Continued)

FOREIGN PATENT DOCUMENTS

| | | |
|---|---|---|
| CN | 103259709 | 8/2013 |
| CN | 103501392 | 1/2014 |

(Continued)

*Primary Examiner* — Fred Casca
(74) *Attorney, Agent, or Firm* — Shaddock Law Group, PC

(57) ABSTRACT

A method for determining a geographic location of a mobile electronic device and providing a local emergency services number to the mobile electronic device based on the determined geographic location, including receiving a request to place an emergency services call; determining, in response to receiving the request to place the emergency services call, a current cellular geolocation of the mobile electronic device; accessing a cellular geolocation/local emergency services number table; determining a local emergency number for the current cellular geolocation, using the current cellular geolocation and at least some information stored in the cellular geolocation/local emergency number table; and placing the requested emergency services call, using the determined local emergency number for the current cellular geolocation.

8 Claims, 6 Drawing Sheets

(56) References Cited

U.S. PATENT DOCUMENTS

| | | |
|---|---|---|
| 8,526,985 B2 | 9/2013 | Cilli et al. |
| 8,606,073 B2 | 12/2013 | Woodman |
| 8,819,738 B2 | 8/2014 | Gresta |
| 9,084,021 B2 | 7/2015 | Bieselt et al. |
| 9,251,852 B2 | 2/2016 | Bums |
| 9,363,539 B2 | 6/2016 | Das |
| 2002/0085029 A1 | 7/2002 | Ghani |
| 2002/0087592 A1 | 7/2002 | Ghani |
| 2004/0073437 A1 | 4/2004 | Halgas, Jr. et al. |
| 2006/0206561 A1 | 9/2006 | Chen et al. |
| 2007/0239562 A1 | 10/2007 | Lawson |
| 2007/0297359 A1 | 12/2007 | Li |
| 2008/0133767 A1 | 6/2008 | Birrer et al. |
| 2011/0088068 A1 | 4/2011 | Patnoe et al. |
| 2011/0285863 A1 | 11/2011 | Burke et al. |
| 2012/0064947 A1 | 3/2012 | Yi et al. |
| 2012/0284755 A1 | 11/2012 | Keret et al. |
| 2013/0286211 A1 | 10/2013 | Cao |
| 2013/0312041 A1 | 11/2013 | Gresta |
| 2014/0101781 A1 | 4/2014 | Bouknight |
| 2014/0160223 A1 | 6/2014 | Bieselt et al. |
| 2014/0331255 A1 | 11/2014 | Howe et al. |
| 2015/0020135 A1 | 1/2015 | Frusina et al. |
| 2015/0042447 A1 | 2/2015 | Vogt et al. |
| 2015/0043892 A1 | 2/2015 | Groman |
| 2015/0295726 A1 | 10/2015 | Bland |
| 2016/0007067 A1 | 1/2016 | Lai et al. |
| 2016/0014455 A1 | 1/2016 | Jabara et al. |
| 2016/0037187 A1 | 2/2016 | Das |
| 2016/0057457 A1 | 2/2016 | Clements et al. |
| 2016/0105770 A1 | 4/2016 | Christian |
| 2016/0156953 A1 | 6/2016 | Phipps et al. |

FOREIGN PATENT DOCUMENTS

| | | |
|---|---|---|
| KR | 101457529 | 11/2014 |
| WO | WO2011043886 | 4/2011 |
| WO | WO2014035818 | 3/2014 |
| WO | WO2015107522 | 7/2015 |

LOCATION BASED LOCAL EMERGENCY CONTACT

CROSS-REFERENCE TO RELATED APPLICATIONS

This patent application claims the benefit of U.S. Patent Application Ser. No. 62/319,044, filed Apr. 6, 2016 and U.S. Patent Application Ser. No. 62/403,629, filed Oct. 3, 2016, the disclosures of which are incorporated herein in their entireties by reference.

STATEMENT REGARDING FEDERALLY SPONSORED RESEARCH OR DEVELOPMENT

Not Applicable.

REFERENCE TO SEQUENCE LISTING, A TABLE, OR A COMPUTER PROGRAM LISTING COMPACT DISC APPENDIX

Not Applicable.

NOTICE OF COPYRIGHTED MATERIAL

The disclosure of this patent document contains material that is subject to copyright protection. The copyright owner has no objection to the reproduction by anyone of the patent document or the patent disclosure, as it appears in the Patent and Trademark Office patent file or records, but otherwise reserves all copyright rights whatsoever. Unless otherwise noted, all trademarks and service marks identified herein are owned by the applicant.

BACKGROUND OF THE PRESENT DISCLOSURE

1. Field of the Present Disclosure

The present disclosure relates generally to the field of mobile or other electronic devices capable of cellular and/or text and audio/video communications. More specifically, the presently disclosed systems and/or methods relate to methods for placing an emergency services call using a local emergency number.

2. Description of Related Art

Numerous mobile electronic devices, such as, for example, mobile phones, tablets, and portable media players are capable of cellular and/or audio video communications.

These mobile electronic devices typically allow a user to make audio phone calls or video chat over cellular networks or other wireless communication systems.

In the United States most people are familiar with "911" as the number used to reach emergency services. However, not every country uses "911" as its emergency contact number. For Example, England uses "112" and "999", China uses "120", Japan uses "120", India uses "100" and "101", Sweden uses "112".

Any discussion of documents, acts, materials, devices, articles, or the like, which has been included in the present specification is not to be taken as an admission that any or all of these matters form part of the prior art base or were common general knowledge in the field relevant to the present disclosure as it existed before the priority date of each claim of this application.

BRIEF SUMMARY OF THE PRESENT DISCLOSURE

With all of these different numbers for reaching emergency services, a hazard is created for people traveling abroad caught in or witnessing an emergency if they do not know what the particular local emergency services numbers are.

In order to overcome these and various other shortcomings in reaching emergency services, various exemplary, nonlimiting embodiments of the present disclosure optionally provide a systems and/or methods that automatically detect the geographic location or area where a particular mobile electronic device is located and provide the local emergency services number to the mobile electronic device. The systems and/or methods of the present disclosure then provide a "Call Emergency Services" (or equivalent) selectable icon on the display of the mobile electronic device. If a user presses or selects the "Call Emergency Services" selectable icon, the systems and methods of the present disclosure automatically call the local emergency services number for the particular geographic area where the user is located.

In various exemplary, nonlimiting embodiments of the present disclosure, an application (app) or software operating on the mobile electronic device implements the systems and/or methods of the present disclosure on the mobile electronic device.

In certain exemplary, nonlimiting embodiments, the present disclosure optionally provides a method for determining a geographic location of a mobile electronic device and providing a local emergency services number to the mobile electronic device based on the determined geographic location, including at least some of determining a current cellular geolocation of the mobile electronic device; establishing the determined current cellular geolocation as the listed current cellular geolocation for the mobile electronic device; accessing a cellular geolocation/local emergency services number table; determining a local emergency number for the listed current cellular geolocation, using the listed current cellular geolocation and at least some information stored in the cellular geolocation/local emergency number table; establishing the determined local emergency services number as a listed current local emergency number for the mobile electronic device; determining a subsequent current cellular geolocation for the mobile electronic device; accessing information regarding the listed current cellular geolocation for the mobile electronic device; comparing the listed current cellular geolocation with the subsequent current cellular geolocation; determining whether the listed current cellular geolocation matches the subsequent current cellular geolocation, within a determined parameter; updating, if it is determined that the listed current cellular geolocation does not match the subsequent current cellular geolocation, within the determined parameter, the listed current cellular geolocation to the subsequent current cellular geolocation; accessing a cellular geolocation/local emergency services number table; determining a subsequent local emergency number for the listed subsequent current cellular geolocation, using the listed subsequent current cellular geolocation and at least some information stored in the cellular geolocation/local emergency number table; and establishing the determined subsequent local emergency services number as the listed current local emergency number for the mobile electronic device.

In various exemplary, nonlimiting embodiments, the cellular geolocation/local emergency services number table comprises a listing of at least some local emergency services numbers and information regarding the cellular geolocation(s) in which each local emergency services number is valid.

In various exemplary, nonlimiting embodiments, the cellular geolocation/local emergency number table is stored within the mobile electronic device, stored in an application residing within or accessible by the mobile electronic device, or is accessible by the mobile electronic device and/or an application residing within or accessible by the mobile electronic device.

In various exemplary, nonlimiting embodiments, the cellular geolocation of the mobile electronic device is determined based upon one or more signals from one or more mobile communications base stations.

In various exemplary, nonlimiting embodiments, a value of the determined parameter is determined, based on the listed current cellular geolocation or is a predefined value.

In certain exemplary, nonlimiting embodiments, the present disclosure optionally provides a method for determining a geographic location of a mobile electronic device and providing a local emergency services number to the mobile electronic device based on the determined geographic location, including at least some of receiving a request to place an emergency services call; determining, in response to receiving the request to place the emergency services call, a current cellular geolocation of the mobile electronic device; accessing a cellular geolocation/local emergency services number table; determining a local emergency number for the current cellular geolocation, using the current cellular geolocation and at least some information stored in the cellular geolocation/local emergency number table; and placing the requested emergency services call, using the determined local emergency number for the current cellular geolocation.

In certain exemplary, nonlimiting embodiments, the present disclosure optionally provides a method for determining a geographic location of a mobile electronic device and placing a call to a local emergency services number, via the mobile electronic device, based on the determined geographic location, including at least some of allowing access to a display screen or feature of the mobile electronic device; presenting a selectable icon on the display screen, while the display screen or feature of the mobile electronic device is accessed, wherein selection of the selectable icon initiates a request to place an emergency services call; determining, in response to a request to place emergency services call, a current cellular geolocation of the mobile electronic device; accessing a cellular geolocation/local emergency services number table; determining a local emergency number for the current cellular geolocation, using the current cellular geolocation and at least some information stored in the cellular geolocation/local emergency number table; and placing an emergency services call, using the determined local emergency number for the current cellular geolocation.

In various exemplary, nonlimiting embodiments, the selectable icon is superimposed over at least a portion of the display screen.

In various exemplary, nonlimiting embodiments, the selectable icon is superimposed over at least a portion of the display screen while a video or still image capture feature of the mobile electronic device is accessed.

The systems and/or methods of the present disclosure utilize information regarding both the country providing the cellular service to the user's mobile electronic device and the location services that the mobile electronic device uses to accurately identify the location of the mobile electronic device for contacting emergency services. By way of further example and illustration, if a user is an American tourist is visiting Israel, and the user is standing in Israel, right at the Lebanese border. The user's American cell phone registers with the Lebanese cell service because of the strong signal out of the Lebanese cell tower that is very close to the user's location. Lebanon's local emergency services number is 112 and Israel's local emergency services number is 100. The user encounters an emergency and, utilizing the systems and/or methods of the present disclosure, in the form of an App running on his cell phone, calls emergency services. The Lebanese emergency services will receive the call even though the user is physically located in Israel. If the user were to dial 100 (the emergency services number for Israel), nothing will happen. The GPS location of the cell phone would identify the user as being located in Israel, but the user's cell phone service is from Lebanon. Thus, the systems and/or methods of the present disclosure utilize the identified country cell service provider, as determined by the cellular geolocation, to determine the local emergency services number and not the GPS location.

When the cell phone is turned on, the cell phone registers with a phone service from a specific country. The systems and/or methods of the present disclosure, operating as an App on the cell phone, will update according to the country providing cellular service to the cell phone. In this manner, the local emergency services number is updated automatically, without appreciable delay.

Accordingly, the presently disclosed systems and/or methods separately and optionally provide methods for automatically call a local emergency services number for a particular geographic area in which a user is located.

The presently disclosed systems and/or methods separately and optionally provide methods for calling a local emergency services number that do not require a user to know or obtain the particular "911" equivalent number for the geographic area in which the user is located.

The presently disclosed systems and/or methods separately and optionally provide methods for "smart dialing" of a local emergency number (i.e., a local equivalent to 911).

The presently disclosed systems and/or methods separately and optionally provide methods for calling 911 (or an equivalent local emergency services number) using a cellular network, while simultaneously recording and streaming live video and audio.

The presently disclosed systems and/or methods separately and optionally provide methods for contacting emergency services utilizing information regarding the country providing the cellular service to the user's mobile electronic device and the location services that the mobile electronic device uses to accurately identify the location of the mobile electronic device.

The presently disclosed systems and/or methods separately and optionally provide cellular geolocation information basing on a countries cell phone towers roaming service, without requiring a cell phone user to change their cell phone service or acquire a new cell phone line from that country.

These and other aspects, features, and advantages of the presently disclosed systems and/or methods are described in or are apparent from the following detailed description of the exemplary, non-limiting embodiments of the presently disclosed systems and/or methods and the accompanying figures. Other aspects and features of embodiments of the presently disclosed systems and/or methods will become apparent to those of ordinary skill in the art upon reviewing the following description of specific, exemplary embodiments of the presently disclosed systems and/or methods in concert with the figures. While features of the presently disclosed systems and/or methods may be discussed relative to certain embodiments and figures, all embodiments of the presently disclosed systems and/or methods can include one or more of the features discussed herein. Further, while one or more embodiments may be discussed as having certain advantageous features, one or more of such features may also be used with the various embodiments of the systems and/or methods discussed herein. In similar fashion, while exemplary embodiments may be discussed below as device, system, or method embodiments, it is to be understood that such exemplary embodiments can be implemented in various devices, systems, and methods of the presently disclosed systems and/or methods.

Any benefits, advantages, or solutions to problems that are described herein with regard to specific embodiments are not intended to be construed as a critical, required, or essential feature(s) or element(s) of the presently disclosed systems and/or methods or the claims.

BRIEF DESCRIPTION OF THE SEVERAL VIEWS OF THE DRAWINGS

As required, detailed exemplary embodiments of the presently disclosed systems and/or methods are disclosed herein; however, it is to be understood that the disclosed embodiments are merely exemplary of the presently disclosed systems and/or methods that may be embodied in various and alternative forms, within the scope of the presently disclosed systems and/or methods. The figures are not necessarily to scale; some features may be exaggerated or minimized to illustrate details of particular components. Therefore, specific structural and functional details disclosed herein are not to be interpreted as limiting, but merely as a basis for the claims and as a representative basis for teaching one skilled in the art to employ the presently disclosed systems and/or methods.

The exemplary embodiments of the presently disclosed systems and/or methods will be described in detail, with reference to the following figures, wherein like reference numerals refer to like parts throughout the several views, and wherein.

DETAILED DESCRIPTION OF EXEMPLARY EMBODIMENTS OF THE PRESENT DISCLOSURE

Figure 1:
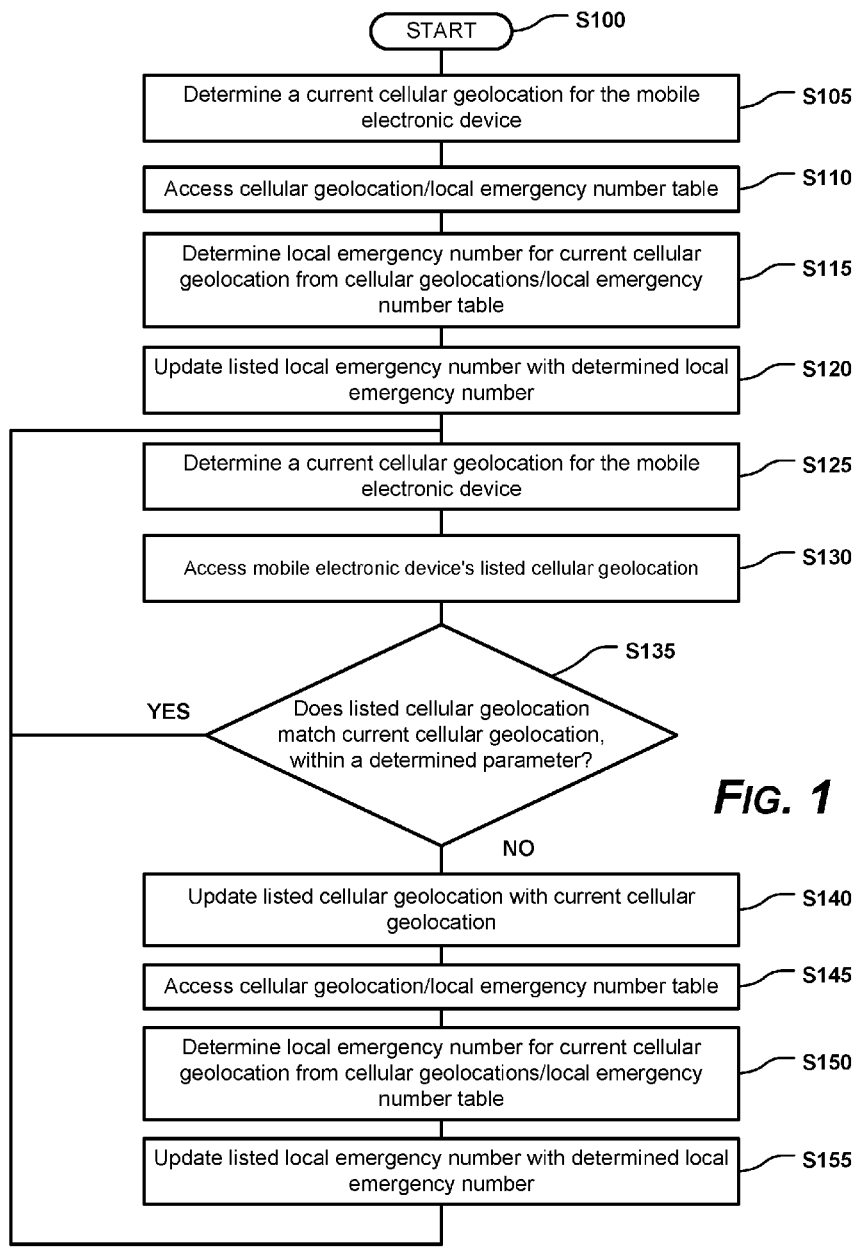
FIG. 1 illustrates an exemplary flowchart outlining exemplary steps for automatically detecting the geographic location or area where a particular mobile electronic device is located and providing the local emergency services number to the mobile electronic device, according to the presently disclosed systems and/or methods.

For simplicity and clarification, the design factors and operating principles of video or image capture according to the presently disclosed systems and/or methods are explained with reference to various exemplary embodiments of video or image capture according to the presently disclosed systems and/or methods. The basic explanation of the design factors and operating principles of video or image capture is applicable for the understanding, design, and operation of video or image capture of the presently disclosed systems and/or methods. It should be appreciated that video or image capture can be adapted to any applications where video or image capture can be used.

As used herein, the word "may" is meant to convey a permissive sense (i.e., meaning "having the potential to"), rather than a mandatory sense (i.e., meaning "must"). Unless stated otherwise, terms such as "first" and "second" are used to arbitrarily distinguish between the exemplary embodiments and/or elements such terms describe. Thus, these terms are not necessarily intended to indicate temporal or other prioritization of such exemplary embodiments and/or elements.

The terms "a" and "an" are defined as one or more unless stated otherwise. Throughout this application, the terms "comprise" (and any form of comprise, such as "comprises" and "comprising"), "have" (and any form of have, such as "has" and "having"), "include", (and any form of include, such as "includes" and "including") and "contain" (and any form of contain, such as "contains" and "containing") are used as open-ended linking verbs. It will be understood that these terms are meant to imply the inclusion of a stated element, integer, step, or group of elements, integers, or steps, but not the exclusion of any other element, integer, step, or group of elements, integers, or steps. As a result, a system, method, or apparatus that "comprises", "has", "includes", or "contains" one or more elements possesses those one or more elements but is not limited to possessing only those one or more elements. Similarly, a method or process that "comprises", "has", "includes" or "contains" one or more operations possesses those one or more operations but is not limited to possessing only those one or more operations.

It should also be appreciated that the terms "mobile electronic device", "local emergency services number", and "911" are used for basic explanation and understanding of the operation of the systems, methods, and apparatuses of the presently disclosed systems and/or methods. Therefore, the terms "mobile electronic device", "local emergency services number", and "911" are not to be construed as limiting the systems, methods, and apparatuses of the presently disclosed systems and/or methods. Thus, for example, the term "mobile electronic device" is to be understood to broadly include any mobile phone, smart phone, tablet, Android platform, and the like.

Furthermore, the terms "Call Emergency Services" and/or "Call Emergency Services" selectable icon are used herein to describe a feature or optional title for a selectable icon utilized in performance of the disclosed systems and/or methods. It should be understood and appreciated that the use of the terms "Call Emergency Services" and/or "Call Emergency Services" selectable icon are merely exemplary and are not to be construed as limiting the present disclosure to the use of those terms. Thus, any equivalent or other terms may be used to identify the selectable icon, without departing from the systems and/or methods of the present disclosure.

Figure 2:
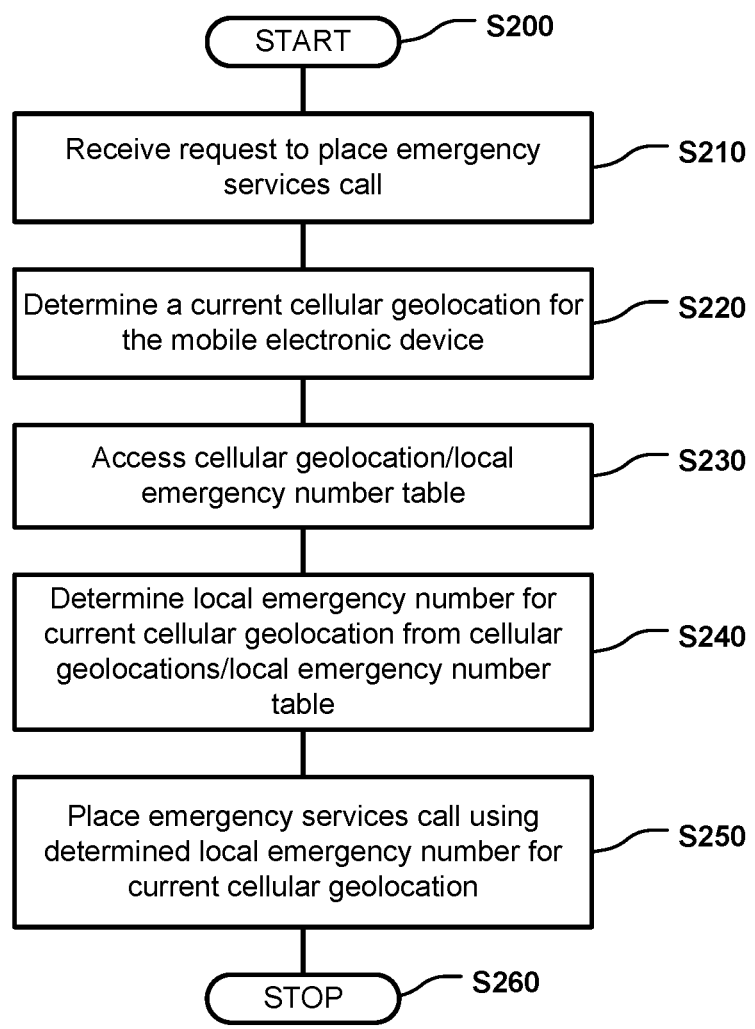
FIG. 2 illustrates an exemplary flowchart outlining exemplary steps for responding to a request to place an emergency services call and placing the emergency services call using a determined local emergency number, based on a current cellular geolocation, according to the presently disclosed systems and/or methods.
Figure 3:
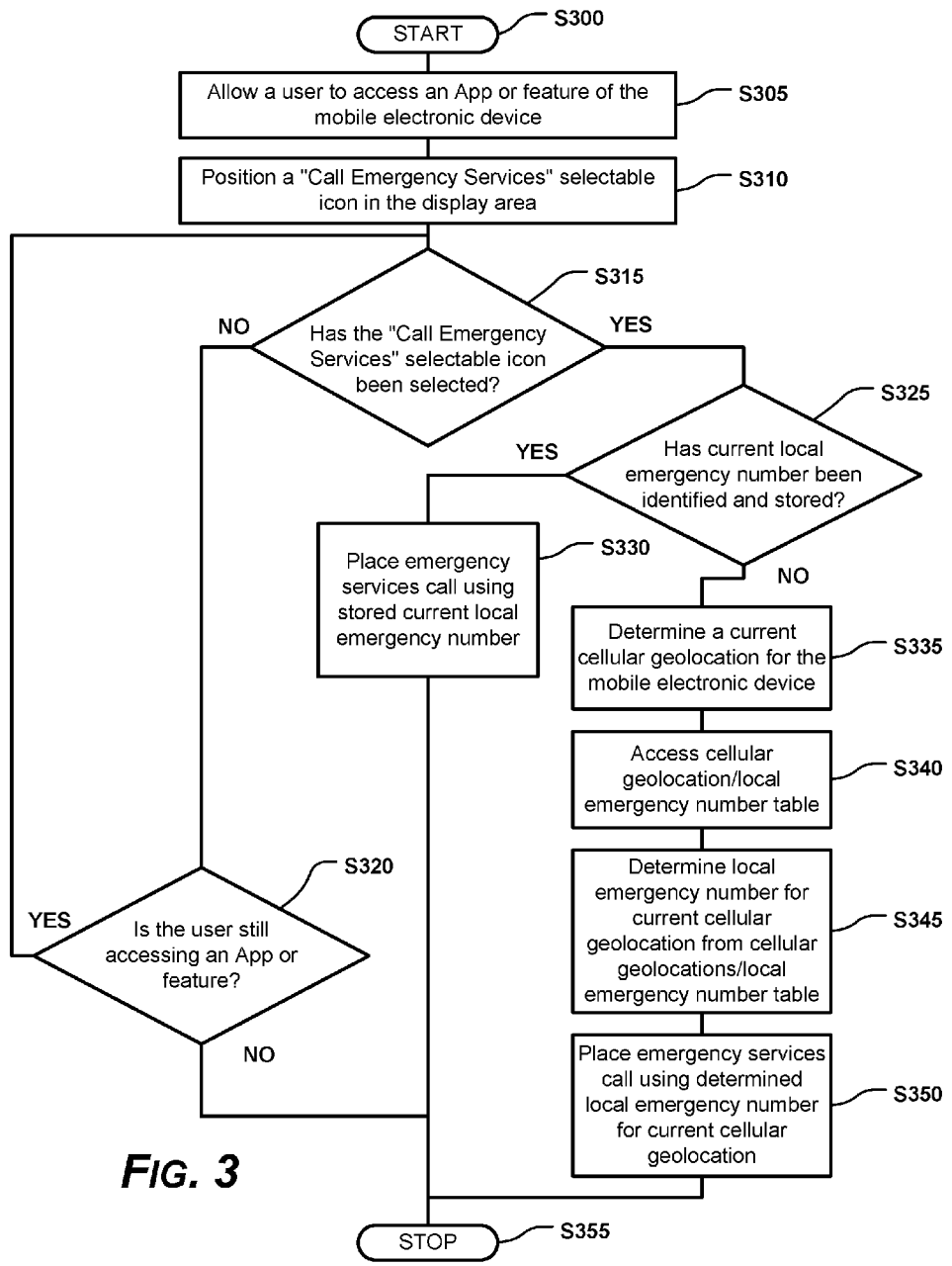
FIG. 3 illustrates an exemplary flowchart outlining exemplary steps for allowing a user to initiate an emergency services call, via a mobile electronic device, based on a current cellular geolocation, while accessing a video or still image capture feature of the mobile electronic device, according to the presently disclosed systems and/or methods.

Turning now to the appended drawing figures, FIGS. 1-3 illustrate various exemplary flowcharts outlining exemplary steps associated with the performance of the systems and/or methods of the present disclosure.

For simplicity and clarification, features of the presently disclosed systems and/or methods will be described as being used in conjunction with a mobile electronic device, such as, for example, a mobile phone. However, it should be appreciated that these are merely exemplary embodiments of the disclosed features and are not to be construed as limiting the presently disclosed systems and/or methods. Thus, the presently disclosed systems and/or methods may be utilized in conjunction with any mobile electronic or other device capable of cellular and/or video communications.

Figure 5:
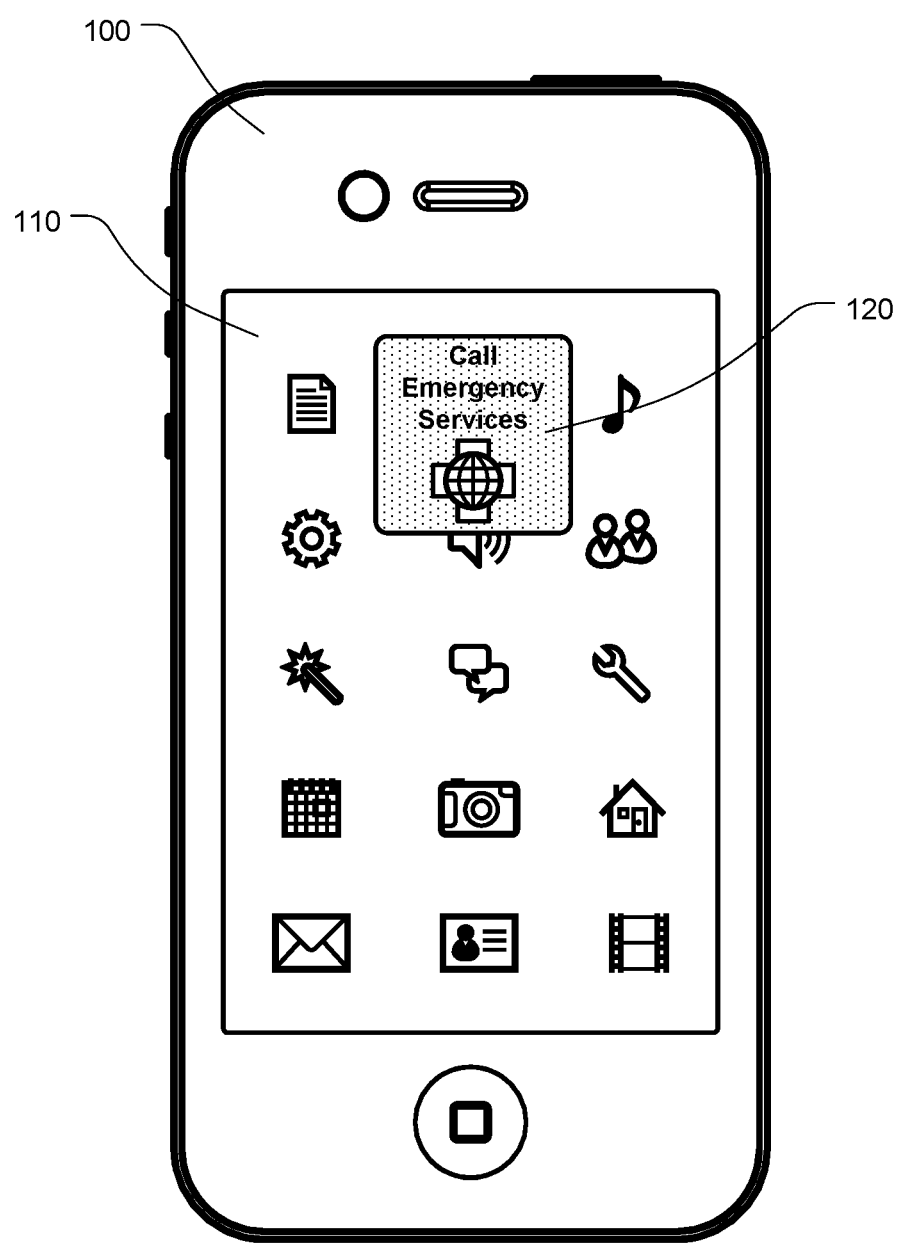
FIG. 5 illustrates an exemplary embodiment of a mobile electronic device, wherein the mobile electronic device provides a "Call Emergency Services" selectable icon, according to the presently disclosed systems and/or methods.
Figure 6:
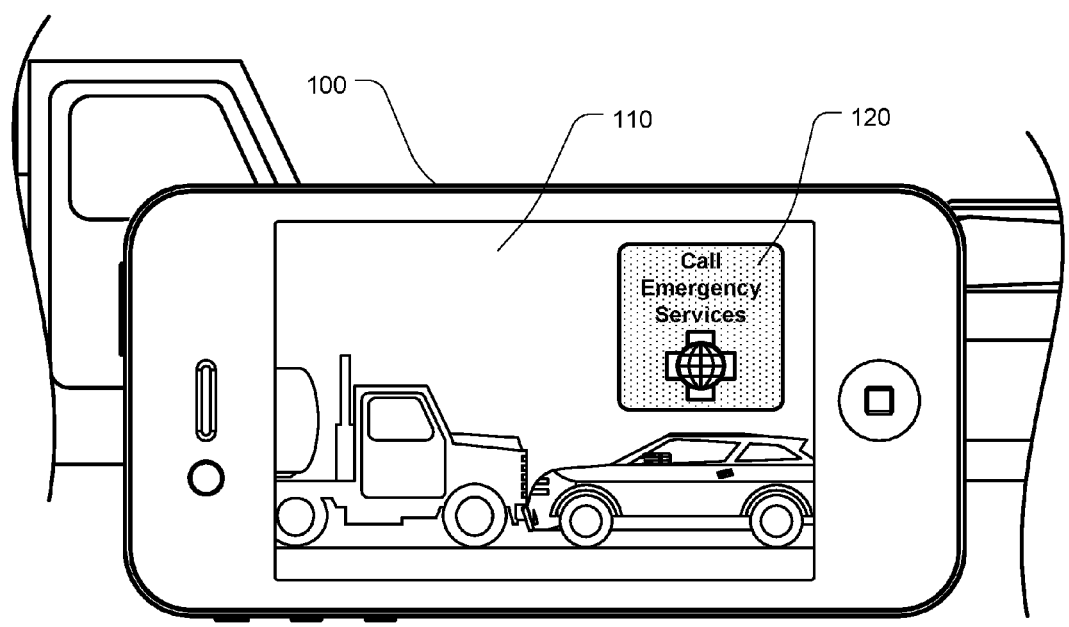
FIG. 6 illustrates an exemplary embodiment of a mobile electronic device, wherein the mobile electronic device provides a "Call Emergency Services" selectable icon, while accessing a video or still image capture feature of the mobile electronic device, according to the presently disclosed systems and/or methods.

FIGS. 5-6 most clearly illustrate an exemplary mobile electronic device 100, capable of being utilized to implement the systems and/or methods of the present disclosure. It should be appreciated that while the mobile electronic device 100 is being illustrated and described as the mobile electronic device that implements the systems and/or methods of the present disclosure, this is merely exemplary and not limiting.

For example, the mobile electronic device 100 comprises at least some of a display 110, which may also function as a touchscreen input device, one or more cameras configured to capture video and/or still images, an audio interface comprising at least one microphone and at least one speaker, and the requisite hardware and/or software for functional operation of the mobile electronic device 100.

In certain exemplary embodiments, the mobile electronic device 100 further comprises at least some of wireless transceiver capabilities, such as, for example, cellular, Bluetooth, or the like for exchanging data over various distances, Global Positioning System (GPS) receiving sensors and/or software for receiving GPS signals and providing geolocation data and information regarding the global position of the mobile electronic device 100.

It should be appreciated that this listing of features and/or elements included in the mobile electronic device 100 are exemplary and not exhaustive. Thus, it should be understood that the mobile electronic device 100, as shown and described, represents only one possible embodiment with one possible combination of features and elements. The features and elements that make up the mobile electronic device 100 and the methods for implementing required and optional software for operation of the mobile electronic device 100, are known in the art. Therefore, a more detailed explanation of the mobile electronic device 100, the constituent components of the mobile electronic device 100, instructions regarding how to incorporate the required and optional elements and/software into the mobile electronic device 100, methods for implementing apps and software on the mobile electronic device 100, and certain other items and/or techniques necessary for the implementation and/or operation of the various exemplary embodiments of the presently disclosed systems and/or methods are not provided herein because such elements are commercially available and/or such background information will be known to one of ordinary skill in the art. Therefore, it is believed that the level of description provided herein with regard to the mobile electronic device 100 and implementation of the techniques, methods, and/or apparatuses of the present disclosure is sufficient to enable one of ordinary skill in the art to understand and practice the techniques and/or methods, as described.

It should also be appreciated that the systems and/or methods disclosed herein may be implemented as software executing on a mobile electronic device, a programmed general-purpose computer, a special purpose computer, a microprocessor, or the like. In various exemplary embodiments, the systems and/or methods disclosed herein may be implemented as an app residing in a mobile electronic device, a routine embedded in a network client, as a resource residing on a network server, or the like. The systems and/or methods disclosed herein may also be implemented by incorporation into a software and/or hardware system, such as the hardware or firmware systems of a mobile electronic device or the like. In general, any device, capable of implementing the systems and/or methods disclosed herein and that is, in turn, capable of implementing the steps outlined in at least one of the exemplary flowcharts shown in FIGS. 1-3, can be used to implement the systems and/or methods disclosed herein.

FIG. 1 illustrates an exemplary flowchart outlining exemplary steps for automatically detecting the geographic location or area where a particular mobile electronic device is located and providing the local emergency services number to the mobile electronic device, according to the presently disclosed systems and/or methods. Utilizing the features of the present disclosure, and following the exemplary steps shown in FIG. 1, in at least one exemplary embodiment of the systems and/or methods of the present disclosure, the exemplary method begins at step S100 and control continues to step S105, wherein the systems and methods of the present disclosure determine a subsequent current cellular geolocation for the mobile electronic device 100. A more detailed explanation of the methods for determining a current cellular geolocation for the mobile electronic device is not provided herein, as such information will be known to one of ordinary skill in the art.

The method then continues to step S110 and the systems and/or methods of the present disclosure access a cellular geolocation/local emergency services number table. In various exemplary embodiments, the cellular geolocation/local emergency services number table includes a listing of known local emergency services numbers (i.e., equivalent to the "911" emergency services number available in the United States) and information regarding the cellular geolocation(s) in which each local emergency services number is valid or may be utilized.

For example, the cellular geolocation/local emergency services number table may include information regarding all of the cellular geolocations or coordinate boundaries for the United States and associate the local emergency services number "911" with all of the cellular geolocations or coordinate boundaries for the United States. In certain instances, the cellular geolocation/local emergency services number table may associate multiple optional local emergency services numbers with a particular cellular geolocation or coordinate boundary. For example, for the local emergency services numbers "112" and "999" may both be associated with cellular geolocations or coordinate boundaries for England.

In certain exemplary embodiments, the cellular geolocation/local emergency number table is stored within the mobile electronic device 100 or an app residing thereon. Alternatively, the cellular geolocations/local emergency number table is stored remote from the mobile electronic device 100 and is accessible by the mobile electronic device 100 and/or an app residing thereon.

The method then continues to step S115 and, using the determined current cellular geolocation and the information stored in the cellular geolocation/local emergency number table, a local emergency number for the current cellular geolocation is determined. Once the local emergency number for the current cellular geolocation of the mobile electronic device 100 is determined, the method advances to step S120 and a listed, current local emergency number for the mobile electronic device 100 is updated with the determined local emergency services number. Thus, if it is determined, for example, that the mobile electronic device 100 is located within the United States, the listed local emergency number for the mobile electronic device 100 is identified as "911". In various exemplary embodiments, the listed local emergency number for the mobile electronic device 100 is stored within the mobile electronic device 100 or an app residing there on. Alternatively, the listed local emergency number is stored remote from the mobile electronic device 100 and is accessible by the mobile electronic device 100 and/or an app residing thereon.

The method then advances to step S125 and the systems and methods of the present disclosure determine a subsequent current cellular geolocation for the mobile electronic device 100.

The method then continues to step S130, where the listed cellular geolocation for the mobile electronic device 100 is accessed. The method then continues to step S135, wherein a determination is made as to whether the listed cellular geolocation matches the current cellular geolocation. In various exemplary embodiments, the determination is based on whether the listed cellular geolocation matches the current cellular geolocation within a determined parameter. In this manner, if a difference between the listed cellular geolocation and the current cellular geolocation is less than, for example, 5 miles, the systems and methods of the present disclosure consider the listed cellular geolocation to match the current cellular geolocation. It should be appreciated that the value of the determined parameter is a design choice based on, for example, the general geographic location within which the mobile electronic device 100 is located. For example, if the mobile electronic device 100 is located in a geographic area where a large number of various local emergency services numbers are present, the determined parameter may be relatively low. Alternatively, if the mobile electronic device 100 is located in a geographic area where a relatively low number of local emergency services numbers present the determined parameter may be relatively high. Thus, if the mobile electronic device 100 is located central to the United States, the determined parameter may be relatively high, as the mobile electronic device 100 would have to relocate a significant distance in order to be outside of the United States' "911" local emergency services number.

If, in step S135, it is determined that the listed cellular geolocation matches the current cellular geolocation, within the determined parameter, the method returns to step S125.

If, in step S135 it is determined that the listed cellular geolocation does not match the current cellular geolocation, within the determined parameter, the method advances to step S140.

In step S140, the listed cellular geolocation of the mobile electronic device 100 is updated to reflect the current cellular geolocation. The method then advances to step S145 and the systems and/or methods of the present disclosure access the cellular geolocation/local emergency services number table. The method then continues to step S150 and, using the determined current cellular geolocation and the information stored in the cellular geolocation/local emergency number table, a local emergency number for the current cellular geolocation is determined.

Once the local emergency number for the current cellular geolocation of the mobile electronic device 100 is determined, the method advances to step S155 and the listed, current local emergency number for the mobile electronic device 100 is updated with the determined local emergency services number. The method then returns to step S125.

The recursive process of at least steps S125-S155 continues, so long as the mobile electronic device 100 continues to operate in accordance with the systems and/or methods of the present disclosure.

FIG. 2 illustrates an exemplary flowchart outlining exemplary steps for automatically detecting the geographic location or area where a particular mobile electronic device is located and providing the local emergency services number to the mobile electronic device, according to the presently disclosed systems and/or methods. Utilizing the features of the present disclosure, and following the exemplary steps shown in FIG. 2, in at least one exemplary embodiment of the systems and/or methods of the present disclosure, the exemplary method begins at step S200 and control continues to step S210, wherein a request to place an emergency services call is received. If the request to place an emergency services call is received, the method advances to step S220, wherein the systems and methods of the present disclosure determine a current cellular geolocation for the mobile electronic device 100. A more detailed explanation of the methods for determining a current cellular geolocation for the mobile electronic device is not provided herein, as such information will be known to one of ordinary skill in the art.

The method then continues to step S230 and the systems and/or methods of the present disclosure access a cellular geolocation/local emergency services number table. The cellular geolocation/local emergency services number table utilized in this method is as described above, with respect to the method illustrated in FIG. 1.

The method then continues to step S240 and, using the determined current cellular geolocation and the information stored in the cellular geolocation/local emergency number table, a local emergency number for the current cellular geolocation is determined.

Once the local emergency number for the current cellular geolocation of the mobile electronic device 100 is determined, the method advances to step S250 and an emergency services call is placed, using the local emergency services number for the determined current cellular geolocation. A more detailed explanation of the methods for controlling the mobile electronic device 100 to place a phone call, using an identified and stored local emergency services number is not provided herein, as such information will be known to one of ordinary skill in the art. Once the emergency services call has been placed, the method continues to step S260, where the method ends.

FIG. 3 illustrates an exemplary flowchart outlining exemplary steps for automatically detecting the geographic location or area where a particular mobile electronic device is located and providing the local emergency services number to the mobile electronic device, while the video or still image capture feature of the mobile electronic device is being utilized. Utilizing the features of the present disclosure, and following the exemplary steps shown in FIG. 3, in at least one exemplary embodiment of the systems and/or methods of the present disclosure, the exemplary method begins at step S300 and control continues to step S305, wherein a user accesses a display screen or feature of the mobile electronic device 100, as illustrated in FIGS. 5-6.

In various exemplary embodiments, the user may access a home screen (as illustrated in FIG. 5), an app, or a video or still image capture feature (as illustrated in FIG. 6) of the mobile electronic device 100. The method then continues to step S310 and a "Call Emergency Services" or equivalent selectable icon 120 is presented to the user in the display area 110 of the mobile device 100. In various exemplary embodiments, the "Call Emergency Services" selectable icon 120 is superimposed over at least a portion of the display area 110. In this manner, the "Call Emergency Services" selectable icon 120 maybe easily and conveniently selected by a user, if an emergency situation arises.

The method then continues to step S315, wherein a determination is made as to whether the "Call Emergency Services" selectable icon 120 has been selected.

If, in step S315, it is determined that the "Call Emergency Services" selectable icon 120 has not been selected, the method continues to step S320, wherein a determination is made as to whether the user is still accessing an App or feature of the mobile electronic device 100. If, in step S320, it is determined that the user is still accessing an App or feature of the mobile electronic device 100, the method returns to step S315.

If, in step S320, it is determined that the user is not still accessing an App or feature of the mobile electronic device 100, the method advances to step S355, where the method ends.

If, in step S315, it is determined that the "Call Emergency Services" selectable icon 120 has been selected, the method advances to step S325, wherein a determination is made as to whether a current a local emergency services number has been identified and stored for access by the mobile electronic device 100. In certain exemplary embodiments, the local emergency services number is stored within the mobile electronic device 100 or an App residing thereon. Alternatively, the local emergency services number is stored remotely from the mobile electronic device 100 and is accessible by the mobile electronic device 100 and/or an App residing thereon.

If, in step S325, it is determined that a current local emergency services number has been identified and stored for access by the mobile electronic device 100, the method advances to step S330. In various exemplary embodiments, the current local emergency services number may be identified and stored for access by the mobile electronic device 100 utilizing the method illustrated and described herein, with reference to FIG. 1.

In step S330, the emergency services call is placed, using the currently identified and stored local emergency services number. A more detailed explanation of the methods for controlling the mobile electronic device 100 to place a phone call, using an identified and stored local emergency services number is not provided herein, as such information will be known to one of ordinary skill in the art. Once the emergency services call has been placed, the method advances to step S335, where the method ends.

If, in step S325, it is determined that a current local emergency services number has not been identified and stored for access by the mobile electronic device 100, the method advances to step S335, wherein the systems and methods of the present disclosure determine a current cellular geolocation for the mobile electronic device 100. A more detailed explanation of the methods for determining a current cellular geolocation for the mobile electronic device is not provided herein, as such information will be known to one of ordinary skill in the art.

The method then continues to step S340 and the systems and/or methods of the present disclosure access a cellular geolocation/local emergency services number table. The cellular geolocation/local emergency services number table utilized in this method is as described above, with respect to the method illustrated in FIG. 1.

The method then continues to step S345 and, using the determined current cellular geolocation and the information stored in the cellular geolocation/local emergency number table, a local emergency number for the current cellular geolocation is determined.

Once the local emergency number for the current cellular geolocation of the mobile electronic device 100 is determined, the method advances to step S350 and an emergency services call is placed, using the local emergency services number for the determined current cellular geolocation. A more detailed explanation of the methods for controlling the mobile electronic device 100 to place a phone call, using an identified and stored local emergency services number is not provided herein, as such information will be known to one of ordinary skill in the art. Once the emergency services call has been placed, the method continues to step S355, where the method ends.

Figure 4:
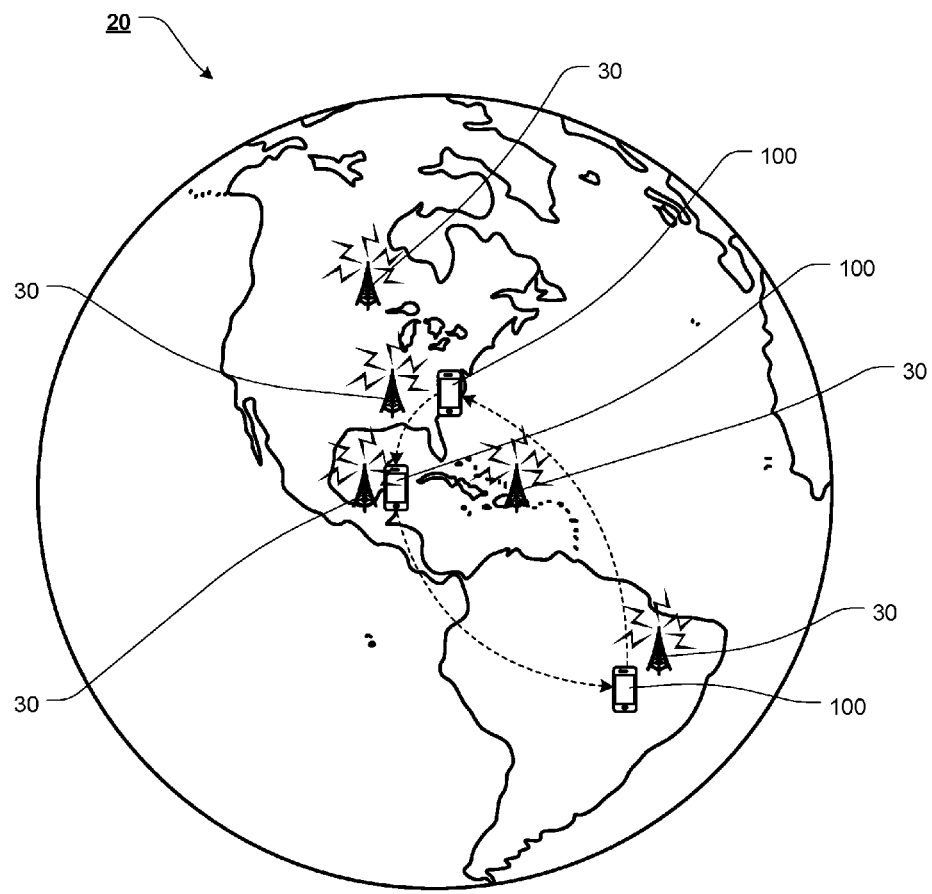
FIG. 4 illustrates an exemplary embodiment of a mobile electronic device, wherein, as a cellular geolocation of the mobile electronic device is changing, a local emergency services number for a current cellular geolocation of the mobile electronic device is updated, according to the presently disclosed systems and/or methods.

FIG. 4 illustrates an exemplary embodiment of a mobile electronic device 100, wherein, as a physical location (i.e., a cellular geolocation based on signals received from one or more mobile communications base stations 30) of the mobile electronic device 100 changes, a local emergency services number for a current cellular geolocation of the mobile electronic device 100 is updated, according to the presently disclosed systems and/or methods. In an illustrative, nonlimiting embodiment, as illustrated in FIG. 4, an exemplary mobile electronic device 100 changes physical location on the globe 20. As illustrated, the mobile electronic device 100 initially moves from a location proximate Virginia Beach, Va., to a location proximate Cancun, Mexico, and finally, to a location proximate Brasilia, Brazil.

In various exemplary, nonlimiting embodiments, the one or more mobile communications base stations 30 comprises a cellular telephone site or tower including antenna and electronic communications equipment, such as, for example, at least one transmitter/receiver, transceiver, digital signal processor, control component, and/or GPS receiver. Together, the one or more mobile communications base stations 30 create a cell of a cellular communications network. One or more of the mobile communications base stations 30 may comprise a Base Transceiver Station (BTS) as part of a Global System for Mobile Communications (GSM) network.

Utilizing the methods of the present disclosure, while the mobile electronic device 100 is located proximate Virginia Beach, Va., the cellular geolocation of the mobile electronic device 100 will be determined to be within the United States and the local emergency services number will be listed as "911". Depending on the determined time delay, if appreciable, in updating the cellular geolocation of the mobile electronic device, when or as the mobile electronic device leaves the United States, the cellular geolocation of the mobile electronic device 100 will be updated and the local emergency services number will also be updated to reflect one or more local emergency services numbers for Mexico or Cancun, Mexico.

When or as the mobile electronic device 100 leaves Mexico or Cancun, Mexico and enters Brazil or Brasilia, Brazil, the cellular geolocation of the mobile electronic device 100 will be updated and the local emergency services number will be updated to reflect one or more local emergency services numbers for Brazil or Brasilia, Brazil. When or as the mobile electronic device leaves Brazil or Brasilia, Brazil, and reenters the United States, the cellular geolocation of the mobile electronic device 100 will be updated and the local emergency services number will be updated to reflect the United States' "911" local emergency services number.

It should be appreciated that depending on factors, such as, for example, the speed of travel between geographic locations and any determined time delay between determining the current cellular geolocation, the determined cellular geolocation and resulting local emergency services number may alter as the mobile electronic device 100 travels between destinations.

FIGS. 5 and 6 illustrate certain exemplary embodiments of a mobile electronic device 100, wherein the mobile electronic device provides a "Call Emergency Services" selectable icon 120, while the user is accessing a home screen (as illustrated in FIG. 5), an app, or a video or still image capture feature (as illustrated in FIG. 6) of the mobile electronic device 100.

In various exemplary embodiments, as illustrated, the "Call Emergency Services" selectable icon 120 may optionally be superimposed over at least a portion of the display area 110. In this manner, the "Call Emergency Services" selectable icon 120 maybe easily and conveniently selected by a user, if an emergency situation arises.

In various exemplary embodiments, as illustrated in FIG. 5, the "Call Emergency Services" selectable icon 120 may optionally be displayed atop a home screen, within the display area 110. Alternatively, the "Call Emergency Services" selectable icon 120 may be represented as a typical App icon and displayed on an initial home screen or other screen of the display 110.

By displaying the "Call Emergency Services" selectable icon 120 in a superimposed position or as an App icon, the "Call Emergency Services" selectable icon 120 can be easily located and selected by a user.

In certain exemplary embodiments, as illustrated in FIG. 6, the "Call Emergency Services" selectable icon 120 may optionally be displayed, within the display area 110, when a video or still image capture feature of the mobile electronic device has been accessed. In this manner, if a user is capturing video or a still image, and, for example, an accident occurs, the user can easily select the "Call Emergency Services" selectable icon 120 to initiate a call to emergency services.

In various exemplary embodiments, if the "Call Emergency Services" selectable icon 120 is selected, the current cellular geolocation of the device is identified, in keeping with the systems and/or methods described herein, and any video being captured are tagged, and a call to the local emergency services number (based on cellular geolocation) is initiated.

If allowed by device, the video capture continues and the user may optionally stream or send captured video or still images to, for example, emergency services.

The ability to call or maintain a call to local emergency services, using cellular networks, while simultaneously capturing and/or streaming live video and audio may depend on whether the mobile electronic device 100 is utilizing a cellular carrier protocol that supports live voice calls simultaneously with data transmission.

Some cellphone carriers do not allow smartphones to use both a voice connection and a data connection simultaneously. For example, in 2016 AT&T allowed a simultaneous voice and data connection, but Verizon Wireless may not. This means that, in some instances, a user on Verizon Wireless may be unable to use the Internet on their smartphone while on a live telephone call.

In certain exemplary embodiments, a simultaneous live voice call with data transmission may be provided to buy an App, running on the mobile electronic device 100. In still other alternatives, one or more of the live voice call and data transmission may be accomplished through a Wi-Fi or other data connection.

In certain instances, when a user initiates a call to a local emergency services number from a mobile electronic device 100, there is no way for the local emergency services' dispatch center to identify the cellular geolocations of the mobile electronic device 100. In accordance with various exemplary embodiments of the present disclosure, when the systems and/or methods of the present disclosure is utilized to place a call to a local emergency services number, the systems and/or methods of the present disclosure automatically detect the cellular geolocation of the mobile electronic device 100 placing the call. When a user selects, for example, the "Call Emergency Services" selectable icon 120, the systems and/or methods of the present disclosure will cross reference the present cellular geolocation with a cellular geolocations/local emergency number table and place a call to an appropriate local emergency services number for the present cellular geolocation of the mobile electronic device 100.

Thus, in various exemplary embodiments, if a user selects the "Call Emergency Services" selectable icon 120, the systems and methods of the present disclosure automatically transmit the present cellular geolocations from the mobile electronic device 100, via a data channel, to a central server, immediately before placing the call to the local emergency service number. The central server then stores these the cellular geolocation information in one or more databases. If the local emergency services dispatch center is utilizing a counterpart piece of software, the local emergency services dispatch center will be able to retrieve the cellular geolocation of the mobile electronic device 100 immediately before the call was placed. This allows the local emergency services dispatch center to send emergency services to the location where the mobile electronic device 100 is located, even if the user is unable to identify his/her location or inaccurately describes his/her location.

While the presently disclosed systems and/or methods has been described in conjunction with the exemplary embodiments outlined above, the foregoing description of exemplary embodiments of the presently disclosed systems and/or methods, as set forth above, are intended to be illustrative, not limiting and the fundamental disclosed systems and/or methods should not be considered to be necessarily so constrained. It is evident that the presently disclosed systems and/or methods is not limited to the particular variation set forth and many alternatives, adaptations modifications, and/or variations will be apparent to those skilled in the art.

It is to be understood that the phraseology of terminology employed herein is for the purpose of description and not of limitation. Unless defined otherwise, all technical and scientific terms used herein have the same meaning as commonly understood by one of ordinary skill in the art to which the presently disclosed systems and/or methods belongs.

In addition, it is contemplated that any optional feature of the inventive variations described herein may be set forth and claimed independently, or in combination with any one or more of the features described herein.

Accordingly, the foregoing description of exemplary embodiments will reveal the general nature of the presently disclosed systems and/or methods, such that others may, by applying current knowledge, change, vary, modify, and/or adapt these exemplary, non-limiting embodiments for various applications without departing from the spirit and scope of the presently disclosed systems and/or methods and elements or methods similar or equivalent to those described herein can be used in practicing the presently disclosed systems and/or methods. Any and all such changes, variations, modifications, and/or adaptations should and are intended to be comprehended within the meaning and range of equivalents of the disclosed exemplary embodiments and may be substituted without departing from the true spirit and scope of the presently disclosed systems and/or methods.

Also, it is noted that as used herein and in the appended claims, the singular forms "a", "and", "said", and "the" include plural referents unless the context clearly dictates otherwise. Conversely, it is contemplated that the claims may be so-drafted to require singular elements or exclude any optional element indicated to be so here in the text or drawings. This statement is intended to serve as antecedent basis for use of such exclusive terminology as "solely", "only", and the like in connection with the recitation of claim elements or the use of a "negative" claim limitation(s).

What is claimed is:

1. A method for determining a geographic location of a mobile electronic device and providing a local emergency services number to said mobile electronic device based on said determined geographic location, comprising:
   determining a current cellular geolocation of said mobile electronic device;
   establishing said determined current cellular geolocation as a listed current cellular geolocation for said mobile electronic device;
   accessing a cellular geolocation/local emergency services number table;
   determining a local emergency number for said listed current cellular geolocation, using said listed current cellular geolocation and at least some information stored in said cellular geolocation/local emergency number table;
   establishing said determined local emergency number as a listed current local emergency number for said mobile electronic device;
   determining a subsequent current cellular geolocation for said mobile electronic device;
   accessing information regarding said listed current cellular geolocation for said mobile electronic device;
   comparing said listed current cellular geolocation with said subsequent current cellular geolocation;
   determining whether said listed current cellular geolocation matches said subsequent current cellular geolocation, within a determined parameter;
   updating, if it is determined that said listed current cellular geolocation does not match said subsequent current cellular geolocation, within said determined parameter, said listed current cellular geolocation to said subsequent current cellular geolocation;
   accessing a cellular geolocation/local emergency services number table;
   determining a subsequent local emergency number for a listed subsequent current cellular geolocation, using said listed subsequent current cellular geolocation and at least some information stored in said cellular geolocation/local emergency number table; and
   establishing said determined subsequent local emergency number as said listed current local emergency number for said mobile electronic device.

2. The method of claim 1, wherein said cellular geolocation/local emergency services number table comprises a listing of at least some local emergency services numbers and information regarding cellular geolocation(s) in which each local emergency services number is valid.

3. The method of claim 1, wherein said cellular geolocation/local emergency number table is stored within said mobile electronic device.

4. The method of claim 1, wherein said cellular geolocation/local emergency number table is stored in an application residing within or accessible by said mobile electronic device.

5. The method of claim 1, wherein said cellular geolocation/local emergency number table is accessible by said mobile electronic device and/or an application residing within or accessible by said mobile electronic device.

6. The method of claim 1, wherein said cellular geolocation of said mobile electronic device is determined based upon one or more signals from one or more mobile communications base stations.

7. The method of claim 1, wherein a value of said determined parameter is determined, based on said listed current cellular geolocation.

8. The method of claim 1, wherein a value of said determined parameter is a predefined value.

* * * * *